(12) United States Patent
Oliveira

(10) Patent No.: US 8,686,832 B2
(45) Date of Patent: Apr. 1, 2014

(54) DEVICE AND SYSTEM FOR PROVIDING CURRENT INFORMATION FOR A GEOGRAPHIC POINT OF INTEREST

(75) Inventor: Alexandre H. Oliveira, San Diego, CA (US)

(73) Assignee: Ronin Licensing, LLC, San Diego, CA (US)

( * ) Notice: Subject to any disclaimer, the term of this patent is extended or adjusted under 35 U.S.C. 154(b) by 248 days.

(21) Appl. No.: 13/087,273

(22) Filed: Apr. 14, 2011

(65) Prior Publication Data

US 2012/0262277 A1    Oct. 18, 2012

(51) Int. Cl.
*G08B 5/22*      (2006.01)
*G06Q 30/00*     (2012.01)
*G05B 19/00*     (2006.01)
*G09F 9/00*      (2006.01)

(52) U.S. Cl.
USPC .......... 340/8.1; 705/14.4; 340/485; 340/5.91; 40/448

(58) Field of Classification Search
USPC ............. 340/485, 691.6, 5.91, 8.1; 705/14.4; 40/448
See application file for complete search history.

(56) References Cited

U.S. PATENT DOCUMENTS

| | | | |
|---|---|---|---|
| 6,473,692 B2 | 10/2002 | Hancock et al. | |
| 6,624,742 B1 * | 9/2003 | Romano et al. | 340/5.73 |
| 6,847,823 B2 | 1/2005 | Lehikoinen et al. | |
| 8,254,338 B2 * | 8/2012 | Anschutz et al. | 370/332 |
| 2002/0174090 A1 * | 11/2002 | Dexter | 707/1 |
| 2005/0160014 A1 | 7/2005 | Moss et al. | |
| 2006/0117625 A1 * | 6/2006 | Peterson | 40/611.01 |
| 2007/0220057 A1 | 9/2007 | Melman et al. | |
| 2008/0079538 A1 * | 4/2008 | Davis | 340/5.91 |
| 2008/0109317 A1 | 5/2008 | Singh | |
| 2009/0083365 A1 | 3/2009 | Feldman | |
| 2009/0139881 A1 | 6/2009 | Lark | |
| 2010/0030708 A1 * | 2/2010 | Ward, II | 705/418 |
| 2010/0121693 A1 | 5/2010 | Pacana | |
| 2010/0205167 A1 | 8/2010 | Tunstall-Pedoe et al. | |
| 2010/0265311 A1 | 10/2010 | Carpenter, Jr. et al. | |

FOREIGN PATENT DOCUMENTS

WO    WO 02/063853 A2    8/2002

OTHER PUBLICATIONS

International Search Report and Written Opinion of the International Searching Authority for PCT Application No. PCT/US2012/032897 dated Oct. 31, 2012.

* cited by examiner

*Primary Examiner* — Benjamin C Lee
*Assistant Examiner* — Adam Carlson
(74) *Attorney, Agent, or Firm* — Charles F. Reidelbach, Jr., Esq.

(57) ABSTRACT

A computer-based system manages and communicates the identity, attributes, and current state of a geographic point of interest. The system includes a beacon device and a distributed data network. The beacon device includes a housing supporting control electronics, a display, and communication electronics. The beacon is placed at a visible location at the geographic point of interest and receives information concerning the geographical point of interest. The display visibly communicates the information while the communication electronics communicates the same information to the distributed data network. A user can query a location-based service and receive the same information from the distributed data network that is being communicated by the display, assuring communication of accurate and consistent information concerning the geographic point of interest.

22 Claims, 9 Drawing Sheets

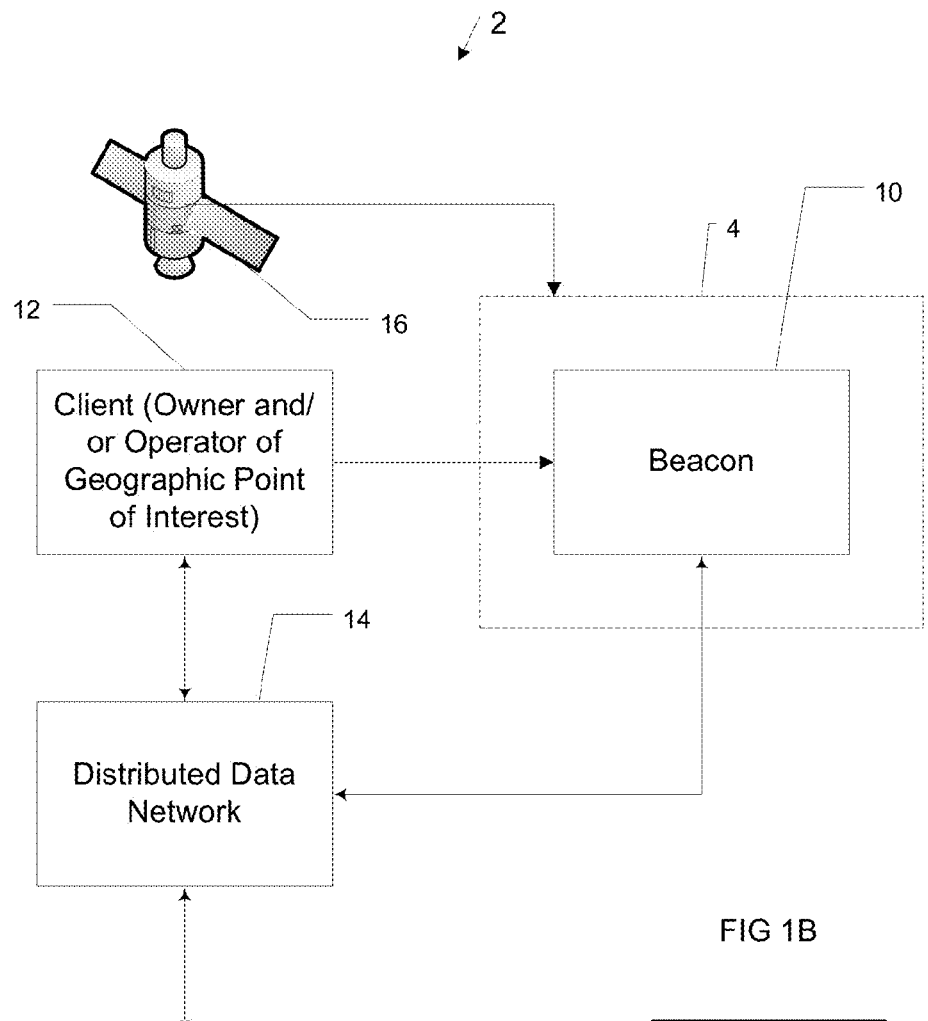
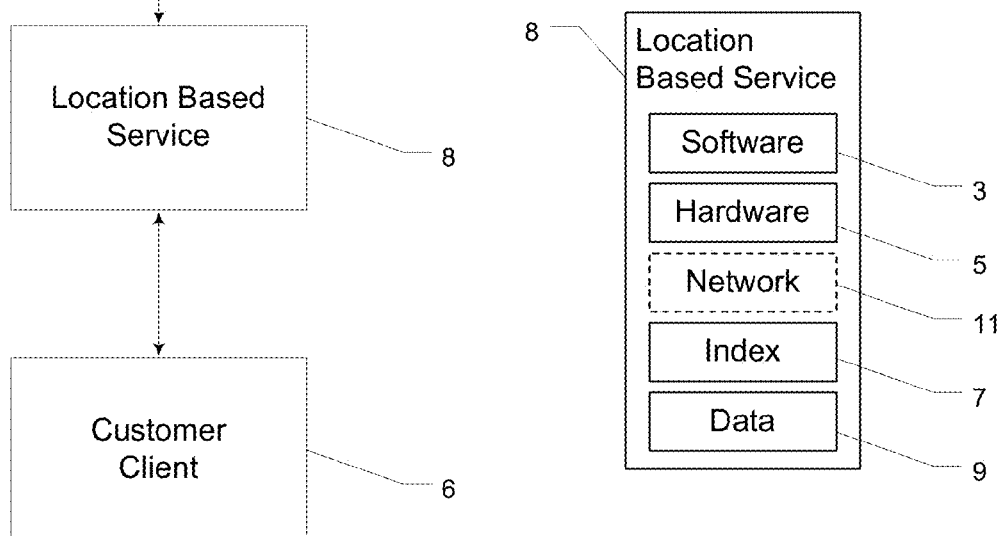
FIG. 1A
FIG 1B

DEVICE AND SYSTEM FOR PROVIDING CURRENT INFORMATION FOR A GEOGRAPHIC POINT OF INTEREST

FIELD OF THE INVENTION

The present invention is generally directed to computer based devices, systems, and networks used to manage and communicate the identity, attributes and current state of a geographic point of interest.

BACKGROUND OF THE INVENTION

Geographic points of interest are locations that provide value or interest to customers such as business customers and consumers. Examples of geographic points of interest include business establishments, retail stores, restaurants, stadium entrances, park entrances, geographic landmarks, meeting places, pharmacies, gasoline stations, service locations, factories, and government agency locations, to name a few.

The traditional way a potential customer has searched for information concerning a geographic point of interest is through published directories such as the "Yellow Pages" or some specific printed publication. This method of searching had its shortcomings: (1) the customer or individual might not have the proper directory on hand, (2) a payment was not received to have the geographic point of interest put into the proper directory, or (3) the directory might be out of date to name a few examples.

The internet has made the process of finding geographic points of interest much more convenient and effective. The publication of online directories and search services has allowed a personal or portable computing device to function as a directory so that a customer generally has access to information about most or all geographic points of interest and a theoretical time lag between a current point of interest status and the publication of information is reduced.

Even so shortcomings still remain. For example, if a business establishment or other point of interest changes location or operating hours there may be lag between such a change and when the information reaches an online service because the associated entity or business may not keep their online listings updated. Even when they do, a temporary change in operating hours may not reach the customer in a timely enough manner if such change is instituted quickly. Thus, when customers search for business establishments or other points of interest on the Internet the results may still be out of date or missing.

One particular challenge is with location based service providers who provide information regarding business establishments on the Internet. Location based service providers today are in a position of having too much information. There are satisfactory data sources available today to compile a comprehensive directory of business establishments. However there is no solution available to allow location based service providers to verify their information directly with the business operator in a scalable cost effective manner. This leaves the location based service providers with no accurate, verifiable and sustainable method to remove closed business establishments from their index. When a business permanently closes its business it has no resources or incentive to remove its online identity from the hundreds of location based service providers.

Another challenge concerns the inability of business operators to control their business establishment online identity. Much their online identity is defined by computer algorithms that function with a "one size fits all" operation. This tends to under- or misrepresent their business establishments. Thus, despite improvements over printed directories, the representation of geographic locations such as business establishments is not always accurate, up to date, or easily searchable by interested customers and individuals.

BRIEF DESCRIPTION OF THE DRAWINGS

The above and other aspects, features and advantages will become more apparent from the description in conjunction with the following drawings presented by way of example and not limitation, wherein identical reference indicia in separate views indicate the same elements and the same combinations of elements throughout the drawings, and wherein:

FIG. 1A is an exemplary block diagram depicting a system according to the present invention.

FIG. 1B is a block diagram depicting elements of a location based service 8.

DETAILED DESCRIPTION OF THE PREFERRED EMBODIMENTS

Figure 2:
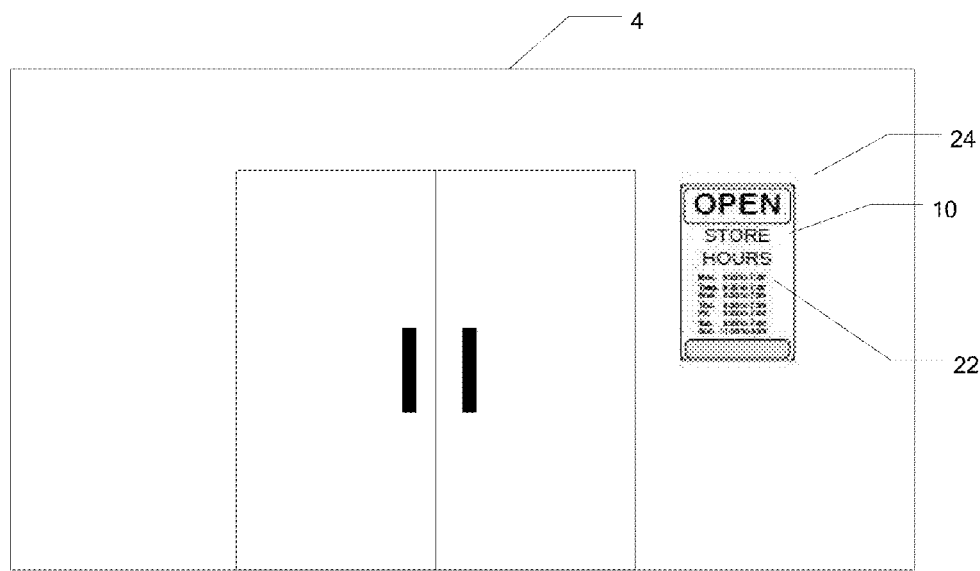
FIG. 2 is an exemplary illustration depicting a visible location of a business establishment 4 at which beacon 10 is positioned.

Geographic points of interests have different definitions within different location based services providers' applications. A scheme to define geographic points of interest is typically accomplished by defining domains. The smallest domain is all known businesses believed to be out of service. The next encompassing domain is all known business establishments. Depending on how the aggregator compiles their directory they may publish from thirteen million to twenty-two million business establishments in the United States. The next encompassing domain is all business establishments which include the unknown business establishments. A new domain has recently evolved from social media applications which includes non-commercial geographic points of interest. All these geographic points of interest are commonly known as "places," or "business establishments." While much of the foregoing discussion will concern business establishments this is only exemplary and much or all of the foregoing may apply to any geographic point of interest.

A system 2 according to the present invention is depicted in block diagram form in FIG. 1A. A geographic point of interest 4 is under the control of an "owner." An owner is an entity (corporation, partnership, LLC, sole proprietorship, S-Corporation, government agency, individual, etc.) that owns, controls, or is responsible for providing or establishing the geographic point of interest 4.

In an exemplary embodiment, the owner is a business that owns a business establishment 4. A single business may also own multiple business establishments 4. Examples of such businesses include major retailers and restaurant chains. As stated earlier, 4 can be any "place" that is under control of an operator of that "place".

A business operator is a person who has the access, ability and authority to manage the business establishment's online identity, attributes and current operator status. The "ideal" business operator is the person or persons who turn the key every day to open and close the retail front door of the business establishment entrance.

The status of this "place" or business establishment 4 is important to a current or potential customer of the business. The customer operates a customer client device 6 configured to perform a local search for a business establishment by querying or browsing a location based service 8.

The digital representation of a geographic point of interest may be a collection of several fields. These fields can be classified into three categories, identity fields, attribute fields and operating status fields. Identity fields unambiguously specify the business establishment. Examples of identity fields may include the business name, tax identification code, business address, to name a few examples. The attribute fields describe the business establishment while the operating status fields describe the current state of the establishment. Examples of business attributes can include operating days and/or hours, access days and/or hours, payment types accepted, product lines carried, services provided, associated businesses, GPS coordinates, to name a few examples. Examples of operating status can include whether an establishment is open or closed for business, whether there is access to an entrance, whether certain personnel are present, access road conditions, local weather conditions, what services are immediately available, whether certain key products are in stock, to name a few examples.

Location based service 8 may be an online directory service, a search engine, or a social media service. In some embodiments location based service 8 may be accessed via a web browser or an application that executes on customer client 6. Alternatively the location based service 8 may be directly accessed by a customer without the use of a customer client 6. An example of a directly accessed service 8 would be a dedicated GPS system in a car that contains all of the information and is directly accessed by a customer without the use of a separate client computer.

In one embodiment, a location based service 8 provides a consumer end user the ability to browse the results of a spatially based query for the geographic points of interest meeting the spatial search criteria. Location based service providers then layer proprietary application features to complete their proprietary business model. As in FIG. 1B, a location based service 8 has five major components, software 3, hardware 5, an index 7, data component 9 and an optional network component 11. The Index 7 is a data structure to optimize queries by mapping attributes to identities in a high performance manner. In the case of a spatial index 7 latitude and longitude coordinates are spatially mapped to a direct access identity of the geographic points of interest. The data component 9 stores all the attributes of the geographic points of interest including but not limited to the operating status, hours of operation, and payment methods accepted. The network component 11 is optional.

In the case of a mobile search application both the index 7 and data component 9 are remotely hosted in a data center and accessed per query over a network. Updates to both the index and data are done continuously. In the case of a CD-ROM based in-car navigation system both the index and data are static. There is no network component and updates are usually available annually via CD-ROM disk replacement.

Placed within or proximate to geographic point of interest 4 is a beacon device 10. Beacon device 10 is positioned at a visible location relative to geographic point of interest 4. Beacon 10 is configured to receive information from various sources including a user (via a user interface), a business client 12, a distributed data network 14, and a source of GPS (global positioning system) information 16.

Client 12 is a client device owned and controlled by an owner that owns and/or controls geographic point of interest 4. Client 12 may communicate with beacon 10 either directly (such as over an IEEE 802.11 link) or through a distributed data network 14. As shown in FIG. 1A, client 12 provides information to beacon 10 that is indicative of attributes such as operating hours or forms of payment accepted at geographic point of interest 4. Beacon 10 also stores other information received from client 12 such as an identity of geographic point of interest 4 along with associated information such as a telephone number and a postal address for geographic point of interest 4.

Beacon 10 is configured to receive attribute information from business client 12 and operating status information that is indicative of a current operating status of geographic point of interest 4. An example of current state information is whether or not a business establishment 4 is open or closed. Beacon 10 is also configured to receive GPS data from GPS data source 16. Beacon 10 is configured to display an image that is indicative of current information including the attribute information and the operating status information and to transmit the current information to distributed data network 14.

The distributed data network 14 is in turn configured to transmit the current information to location based service 8. When a customer client 6 queries or browses location based service 8 regarding business establishment 4, location based service 8 can include the current information in real-time to the customer client 6 in response. The current information may be integrated into the standard directory listing or it may be provided as an overlay or update.

The distributed data network 14 will use a change management system to optimize synchronization between multiple beacons 10 and location based services 8. The change management system may include a concatenation of a unique identifier of the beacon 10 joined with a revision number that is incremented each time a change occurs on the beacon 10. The beacon specific revision numbers can be stored by the location based service provider 8 and efficiently compared to the current revision number on the beacon 10 via the distributed data network 14 to determine if the location based service provider is current. Only storing the revision number or other similar techniques may be used to optimize synchronization while maintaining a single truth on the beacon and not creating copies of data that can be out of date.

It is to be understood that system 2 (FIG. 1A) is a computer network whose members (elements 6, 8, 10, 12, and 14) are locally or remotely linked relative to one another by a computer network. In an exemplary embodiment the following are the linkages: 1) customer client 6 and location based service 8 are remotely linked by the Internet; 2) location based service 8 and distributed data network 14 are remotely linked by the Internet; 3) distributed data network 14, business client 12, beacon 10 are all remotely linked by the Internet. There may be other linkages as well—for example, business client 12 and beacon 10 may be locally linked by a network using an Ethernet port or a wireless protocol such as IEEE 802.11. Alternatively business client 12 and beacon 10 may communicate by broadband mobile networks such as 3G and 4G.

The devices of network 2 (elements 6, 8, 10, 12, and 14) are generally all computing devices. Customer client 6 and business client 12 are typically client-type devices which can be one or more of a laptop, desktop computer, smart phone (cell phone with data capability), a tablet computer, a PDA (personal digital assistant) or any client device 6 that may communicate with a network such as the Internet. Location based service 8 would preferably include high performance servers, database, and mass storage, particularly when location based service 8 is a search engine. Distributed data network 14 may include a data center including servers, mass storage, and a database. Beacon device 10 may be configured as either a client or a server and will be further described below.

Figure 3A:
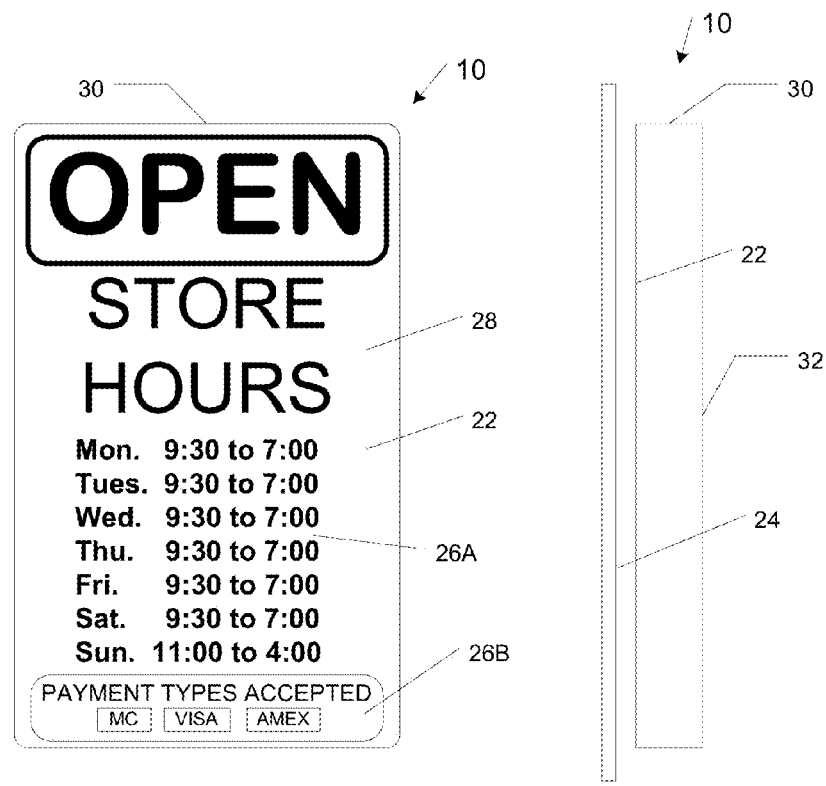
FIG. 3A depicts an exemplary front view of beacon 10.
Figure 3B:
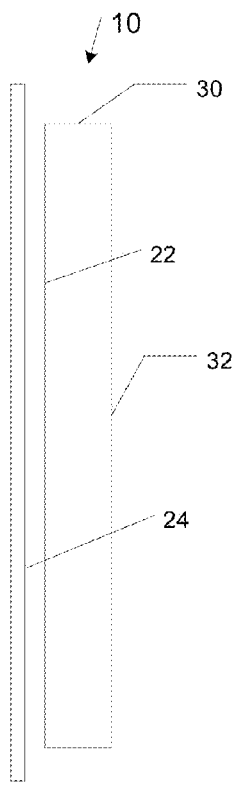
FIG. 3B depicts an exemplary side view of beacon 10 that is proximate to a vertical surface 24.

FIGS. 2, 3A, and 3B depict details of beacon 10 including its general outward construction and physical deployment at a geographic point of interest 4, which, in this case, is a business establishment. Beacon 10 is configured to be located at a visible location of business establishment 4. FIG. 2 is an illustrative view of beacon 10 deployed at a front entrance (one example of a visible location) of a retail establishment 4. Beacon 10 includes display 22. Beacon 10 is supported adjacent to a vertical surface 24, in this case a window of retail establishment 4 so that display 22 is visible outside of retail establishment 4.

FIGS. 3A and 3B depict front and side views of beacon 10 respectively. As depicted in FIG. 3A in more detail, an image on display 22 communicates information including attributes 26 of business establishment 4 including operating hours 26A and payment types accepted 26B. In addition, display 22 communicates a current state 28 of business establishment 4 which is open for business. The current state information 28 is the same as the current state information 28 communicated by beacon 10 to distributed data network 14. Because distributed data network 14 also has the same attribute information 26, distributed data network 14 can therefore provide updated information to a location based service 8 that is current and consistent with that information being communicated by display 22.

While FIG. 3A includes a front view of beacon 10, FIG. 3B includes a side view depicting beacon 10 mounted, hung, affixed, or suspended adjacent to vertical surface 24. In one embodiment beacon 10 includes a thin rectangular outer housing 30 hung with its longest axis oriented vertically. In a preferred embodiment beacon 10 includes an onboard gyroscope or other sensor that automatically orients a displayed image on display 22 according to the orientation of beacon 10 relative to a gravitational reference. Beacon 10 includes display 22 on one vertical face and a user interface 32 on an opposing vertical face of outer housing 30. An authorized user of beacon 10 may utilize user interface 32 to input operating status information such as an "open for business" state of business establishment 4. In other embodiments of beacon 10, the user interface 32 may be disposed upon a common face with display 22 or disposed on multiple faces. In yet another embodiment display 22 may be touch sensitive and may function as a user interface 32. In yet another embodiment user interface 32 may include a speaker to communicate with a user or customer.

Figure 4:
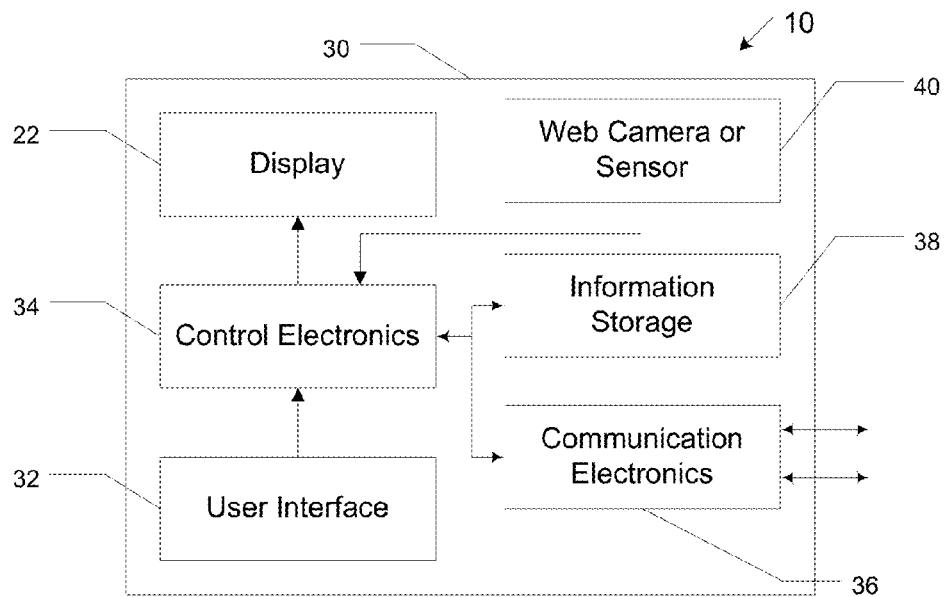
FIG. 4 depicts an exemplary simplified electrical block diagram of beacon 10.

FIG. 4 is a block diagram representation of beacon 10 having outer housing 30 supporting display 22, user interface 32, control electronics 34, communication electronics 36, and information storage device 38. Communication electronics 36 may include any number of communication interfaces such as local wireless (e.g., IEEE 802.11), broadband wireless (e.g., 3G, 4G cellular communications), and GPS (configured to receive data from the global positioning system 16). Information received from user interface 32 and communication electronics 36 may be stored in information storage device 38 by control electronics 34. Information storage device 38 may include volatile and nonvolatile storage devices such as hard drives, flash memory, RAM, video memory, etc. Types of information to be stored may include operating status information (e.g., whether retail establishment 4 is open or closed), retail establishment attribute information (e.g., operating hours, payment types accepted), GPS data just received, and identifier information related to the business establishment or operators that are authorized to access the beacon 10.

Control electronics 34 are configured to generate an image on display 22 that may include some or all of the information received from user interface 32 and communication electronics 36. Control electronics 34 are also configured to transmit some of this received information to distributed data network 14 via communication electronics 36.

Beacon 10 may optionally includes a sensor 40 that provides additional current state information to control electronics 34 such as a local temperature or an image of a portion of business establishment 4. Sensor 40 can be any or all of a web camera, a motion sensor, a microphone, or an IR interface to interact with a smart phone. Alternatively a wireless camera or sensor 40 may provide information to control electronics 34 via communication electronics 36.

Figure 5:
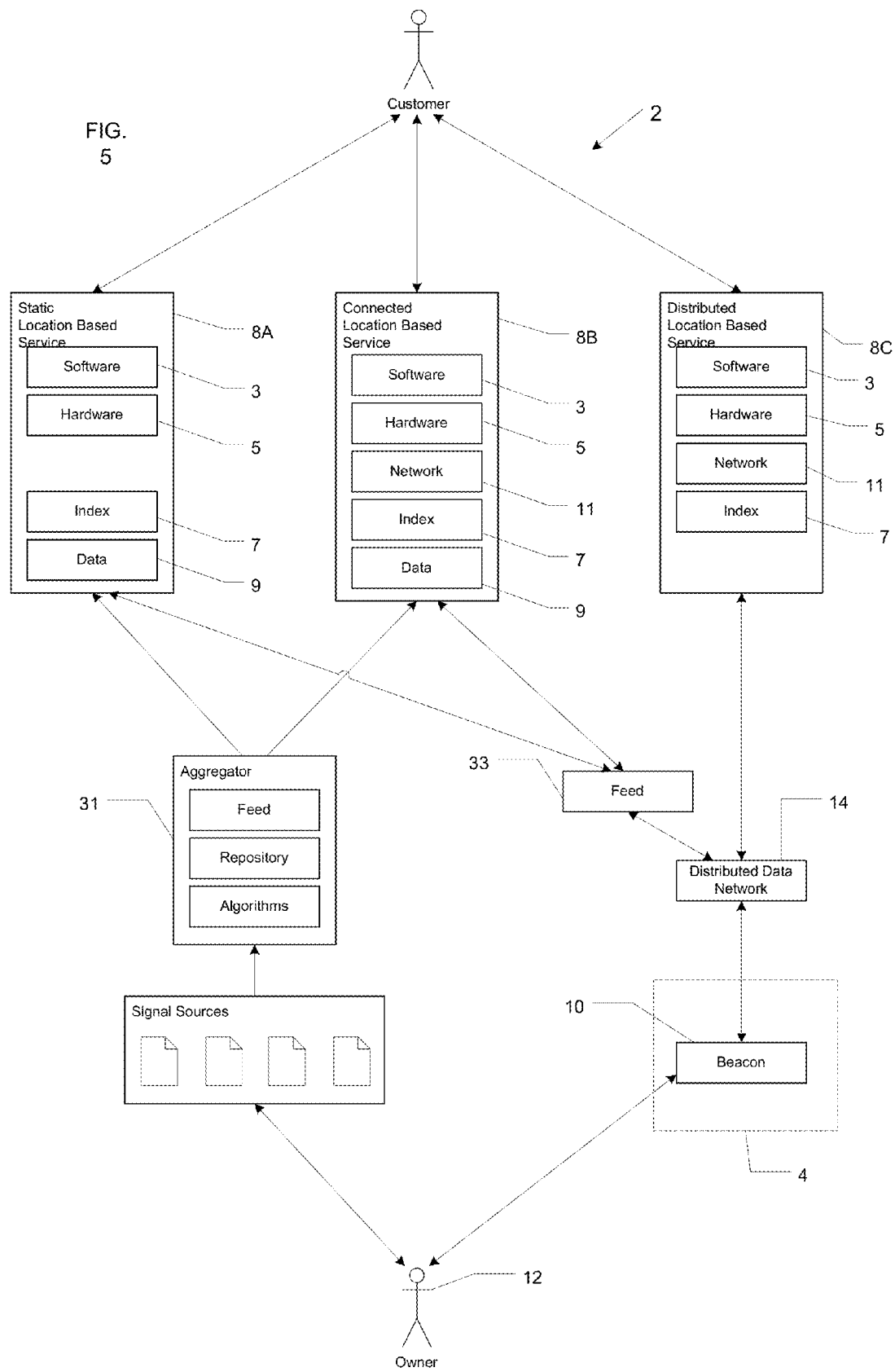
FIG. 5 an exemplary block diagram representation of a system according to the present invention.

FIG. 5 is a schematic block diagram depicting system 2 containing the present invention. System 2 includes various location based services 8A, 8B, and 8C each of which is a different form of a location based service 8. When element 8 is referred to it is to be understood to be one of 8A, 8B, or 8C. A customer queries a location-based service 8 in order to find out information regarding a geographic point of interest 4. As will be explained in the foregoing, the consumer receives results that may be routed through a more conventional route via an aggregator 31 or via the present invention utilizing beacon 10 and distributed data network 14. The consumer may use a client computing device 6 (FIG. 1) to query a location based service 8 or may directly query the location based service 8.

FIG. 5 shows a static location based service 8A which uses the software 3, hardware 5, index 7 and data 9 components of a standard location based service 8. It has both the index 7 and data 9 locally available onboard the device and does not rely on a network connection to execute a query. In most cases both the index and the data are contained on a CD-ROM, DVD, BD disk, or nonvolatile memory device, which is updated annually. This is the data model used by many handheld, portable and in-car GPS/Navigation devices. Some GPS devices store the static index and data on local read/write memory, which is used to execute static queries but can be periodically connected to a network for updates. The network is used only for data updates and not used during the fulfillment of a query. In practice this data model is used for annual updates.

FIG. 5 also shows a connected location based service 8B with the software 3 and hardware 5 components making up the client device 6 connected to a network to access remote data center hosting the index 7 and data 9 components. In this connected data model the network 11 is a critical component of the query fulfillment. This data model in practice is used for monthly updates with some major location based service providers now moving toward daily incremental updates.

These updates are compiled from several data sources. Most all data sources are digital representations of real life events triggered by the business operator or owner 12. These events can be provisioning a telephone directory listing, registering a new address or a change of address with the post office, registering for an online service, and many others.

Aggregators 31 join multiple data sources to compile a single database of all businesses. Aggregators 31 can be a commercial third party or in some cases integrated with the location based service provider 8. Major location based service providers 8 will aggregate multiple data sources in-house with some of their data sources being commercial third party aggregators. Multiple aggregators in the process generates a more comprehensive database but introduces multiple layers of interpretation which moves the final results away from accurate or real time results.

The value and intelligence of the aggregators reside within their compilation algorithms. These software algorithms merge and purge multiple data sources into a single data repository using various data based verification processes. These algorithms each interpret business operator intent by analyzing bits of information from the data sources. Given the same data sources, no two aggregators would compile the same resultant data repository. These algorithms are built with a one-size fits all design. It is impossible to analyze millions of data points and accurately derive business operator intents every single time.

At best, today's aggregator data repository is a digital approximation of the identities, attributes and operating status of business establishments 4. In today's data models this data repository is the best intelligence to both build location based services 8 and verify the identity, attributes and operating status of business establishments 4. It is the most authoritative layer in the data model. There are several commercial third party aggregator data repositories on the market today. No two are the same and none are ever 100% accurate.

Most location-based services today accept complete cut and replace data updates. This is executed through a data feed that is a static snap shot of the data repository usually done every 30 days. The more advanced aggregators and location based service providers can accept incremental delta data files, which include only the changed records for a defined period. Regardless of how small the delta data update period becomes, existing data models requires snapshots to be compiled and published. With 14 to 20 million businesses in the United States in continuous change, the published snapshot is out of date as soon as it is published.

The beacon 10 is optimized through a distributed data network 14. The distributed data network 14 only stores identities and does not store any attributes or operating status. It allows location-based services 8 to efficiently query all beacons 10 directly. It is not an authoritative layer in the data model. It is only a network optimization layer utilizing common techniques like change management control and caching to optimize access to the beacons 10.

For the distributed data network 14, the beacons 10 are the only authoritative layer. This constructs a new data architecture with a single accurate result making all layers 100% accurate since they are never authoritative and can never store a non-accurate result that contradicts the beacons 10. The beacons 10 are also the one and only data source in use per location of a business establishment or geographic point of interest 4. There is no interpretation of the data and data sources do not contradict each other. The beacon is also under the management of the local business operator. This is the idea situation in which the only authoritative element in the data model is in direct management of the business operator.

The distributed data network 14 can support a data feed module 33 for backward compatibility with existing location based services that depend on a traditional snapshot data feed. Without redesign of the location based service 8, not all new capabilities are available but legacy location based services 8 will have access to the most accurate data feed at the time the request is made.

The distributed data network 14 and the data feed module 33 can be integrated with several change management methods to generate incremental delta data feeds. These feeds can be generated based on date and time, revision numbers or other common techniques.

Distributed location based services 8C that are designed to utilize the beacons 10 through the distributed data network 14 will not have a data component 9. These distributed location based services 8C will access the distributed data network directly 14. The location-based service 8 will store the identities of the business establishment 4 and only the attribute information they need for the index 7. All other attributes and operating statuses will be provided to a customer or consumer by directly accessing the beacons 10.

Figure 6:
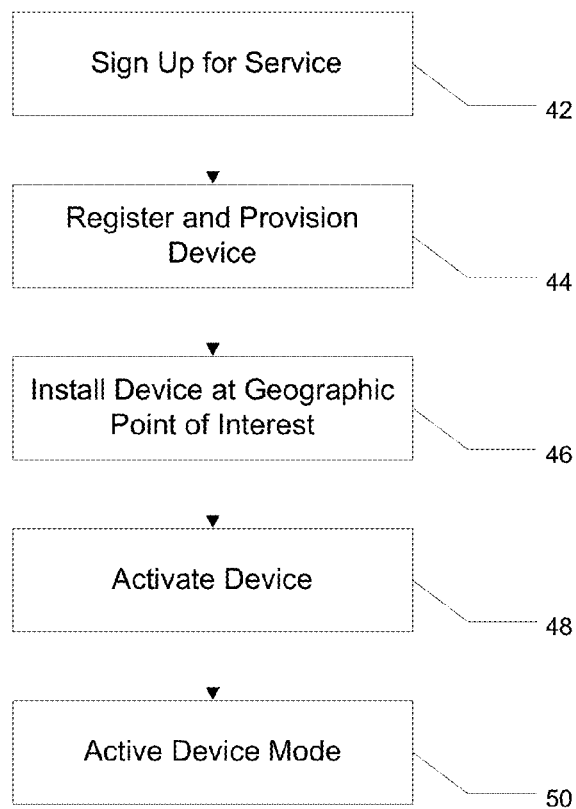
FIG. 6 is an exemplary flow chart representation of a process for installing and activating beacon 10.

FIG. 6 is a flowchart that depicts a process for activating and using a new beacon device 10. Use of the beacon device 10 and distributed data network 14 are part of a service provided to the owner of a geographic point of interest 4 for communicating attributes and a current operating status of the geographic point of interest to customers. According to step 42, an owner of the geographic point of interest 4 signs up for this service.

According to step 44, the owner registers the beacon device 10 with aspects of the geographic point of interest 4 such as (1) geographic point of interest name, (2) location and/or postal address, (3) phone number(s), (4) operating hours, and other information. This registration may include an online communication whereby this information is transferred from an owner client device 12 to beacon 10. Part of the data transferred to beacon 10 would also be transferred to distributed data network 14 in order to register beacon 10 with distributed data network 14.

According to step 46, the beacon device 10 is installed at the geographic point of interest 4 by suspending or securing beacon 10 to a visible location as discussed with respect to FIGS. 2, 3A, and 3B. The device is then activated according to step 48. Part of activating the device may include providing attribute information (e.g. business hours and/or payment types) to beacon 10 to be stored in information storage device 38 and displayed on display 22. Once beacon 10 is activated, it operates in an "active device mode" according to step 50.

Figure 7:
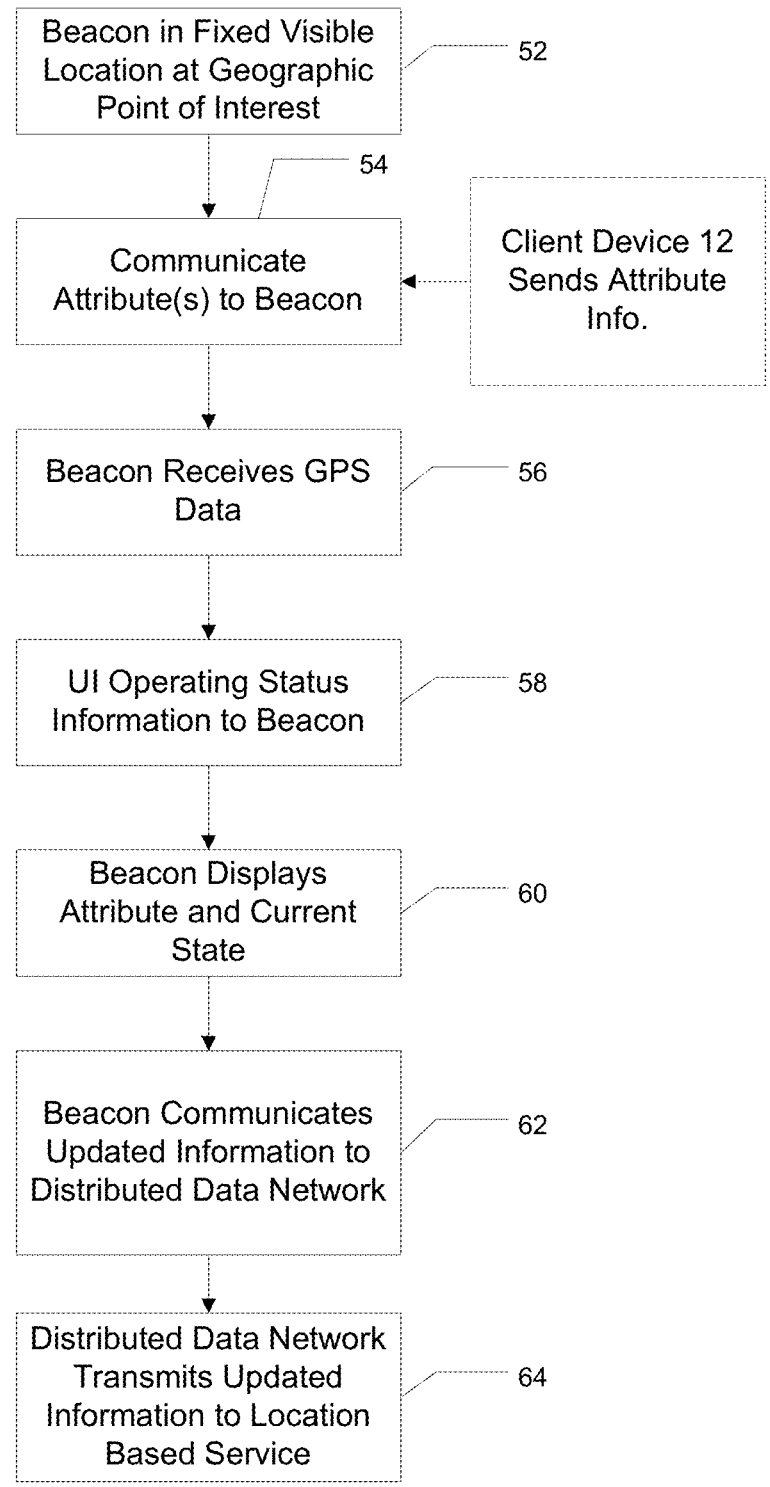
FIG. 7 is an exemplary flow chart representation a process by which current and consistent information is delivered to display 22 of beacon 10 and to a location based service 8.

FIG. 7 is a flowchart representing one way in which matching current or real time information can be simultaneously provided to display 22 and to a customer client 6 who is querying location-based service 8. In other words, the system including the beacon 10 and distributed data network 14 assure that current attribute and operating status information displayed at the business establishment by display 22 is the same attribute and operating status information received by a customer client 6 who is querying a location-based service 8.

According to step 52, a beacon device 10 is provided in a fixed visible location within establishment 4. According to step 54, operator client 12 provides updated geographic point of interest attribute information (e.g., operating hours, payment types accepted, etc.) to beacon 10. Client 12 may communicate the information to beacon 10 either directly (e.g. local wireless link) or through a network such as the Internet.

According to step 56, beacon 10 receives GPS data via communication electronics 36. According to step 58, beacon receives operating status information indicative of a current state of the business establishment (e.g., open or closed) as a result of an input to user interface 32. According to step 60, control electronics 34 generate an image on display 22 that visibly communicates the attribute information and the operating status information as was illustrated in FIGS. 2 and 3A. According to step 62, beacon communicates current information to distributed data network 14 that may include one or more of the operating status information, attribute information, and GPS data.

According to step 64, the remote distributed data network 14 transmits the current information to a location-based service 8. When a user queries location-based service 8, the user will receive results having the current information. The results may include one or more of: 1) whether the business establishment is currently operating; 2) location of the business establishment based upon the GPS data; and 3) currently updated attribute information. The updated information may be integrated into the results or it may be provided as an overlay to the search or query results.

Figure 8:
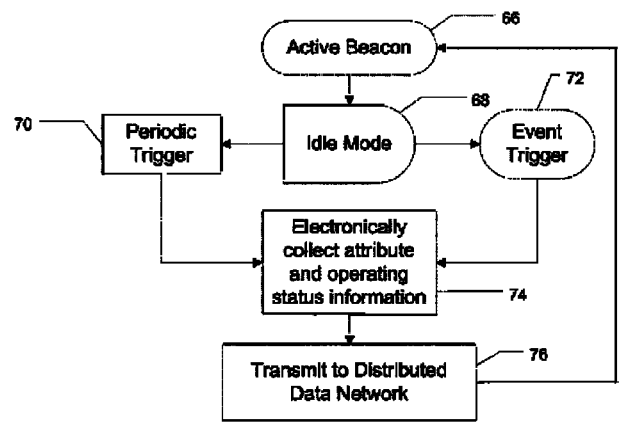
FIG. 8 is an exemplary flow chart representation of an operation of beacon 10.

The operation of beacon device 10 is depicted in FIG. 8. After being activated in step 66, the beacon device 10 operates for most of the time in idle mode 68. A device "ping" operation is triggered according to an elapsed time 70 or an event trigger 72. For example, a periodic trigger 70 might occur every 10 minutes. On the other hand, an event trigger 72 could be receiving an input from user interface 32 (that would define a change in operating status such as an associated store opening or closing) or from distributed data network 14 via communication electronics 36. An input from distributed data network 14 may originate from a customer client 6 querying for information concerning business establishment 4.

According to step 74 and/or in response to the trigger (70 or 72), the control electronics 34 electronically "collects" business establishment attributes, GPS data, and/or business establishment operating status information. "Collecting" the information may refer to reading the information from information storage 38 and/or it may refer to obtaining the information via communication electronics 36, user interface 32, or sensor 40. According to step 76, control electronics 34 then transmits the collected current information to distributed data network 14. The control electronics may simultaneously update display 22 to visually communicate information that is consistent with the collected current or real time information. After step 76, the beacon device 10 returns to idle mode 68.

Figure 9:
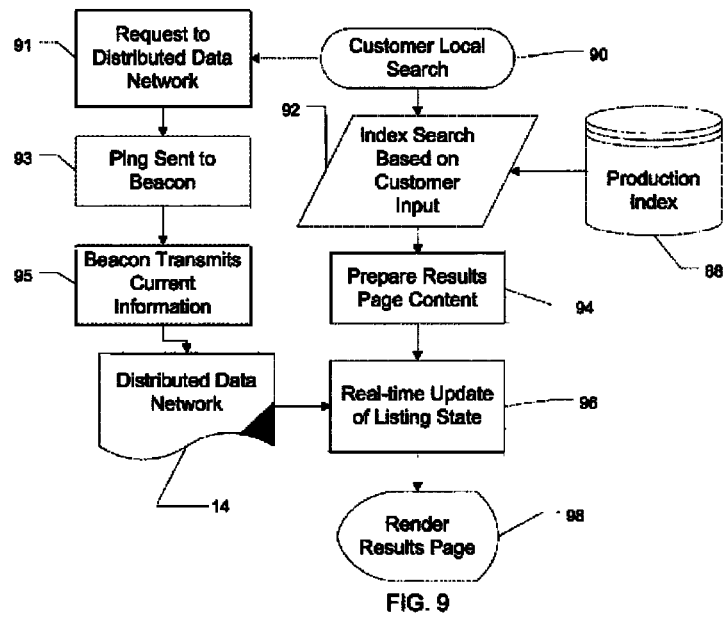
FIG. 9 is an exemplary flow chart representation of a process by which a location based service renders real time information for customer client 6.

FIG. 9 depicts a process by which customer client 6 can obtain current or real time information concerning business establishment 4. According to step 90, a customer client 6 performs a local search 90. According to step 92, an index search is conducted by the location based service 8 based using the production index 88. Production index 88 may include a portion of a search engine database used to optimize speed and performance in finding relevant search results. According to step 94, the location based service 8 prepares page content results. This content is not in real time due to the time lapse between the updating process.

Therefore, according to step 96, a real time update is made based upon information received from the distributed data network 14. This real time update 96 may be in the form of an overlay (or equivalent such as "pop-up", linked results, etc.) relative to the results of step 94. Finally, according to step 98, a page containing the results from step 94 and the real-time update 96 is rendered on the customer client 6.

An optional parallel process can proceed according to steps 91, 93, and 95. According to step 91, the customer local search 90 also triggers the location based service 8 to send a request for an update to the distributed data network 14. According to step 93, this request results in a ping or request to be sent from the distributed data network 14 to beacon 10. The ping according to step 93 is an event trigger (see element 72 of FIG. 8) that causes beacon 10 to provide real time information back to the distributed data network 14. Alternatively, the beacon 10 may send a revision number to distributed data network 14. The distributed data network 14 would check the revision number against the revision number held by the distributed data network 14. If the revision number is a new one, then the distributed data network 14 would request and receive updated information from beacon 10. Thus, the customer local search 90 results in the most current information to be transferred from the beacon 10 in step 90 to the customer client 6.

Figure 10:
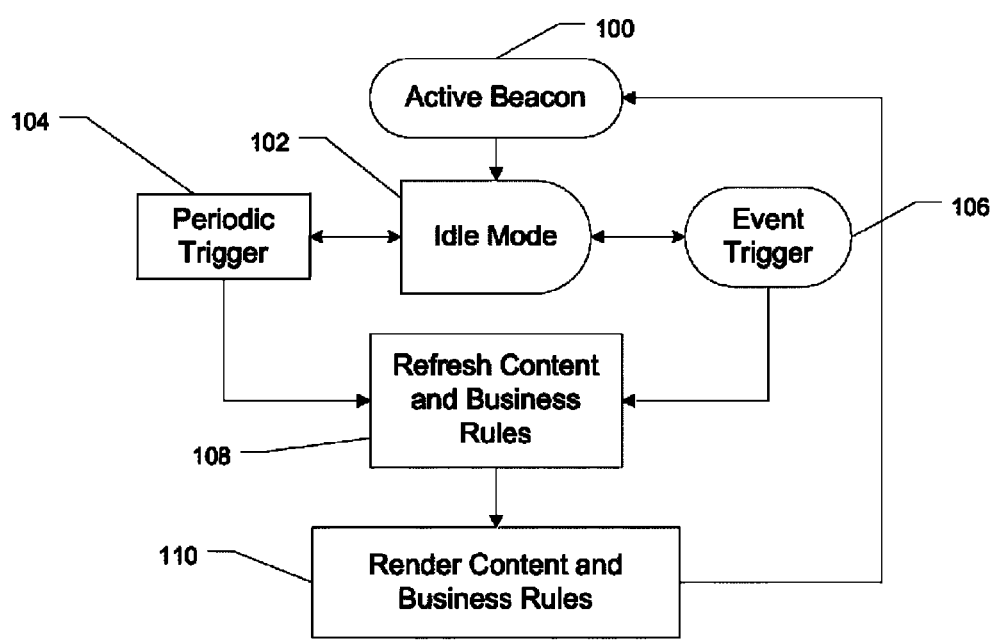
FIG. 10 is an exemplary flow chart representation of an operation of beacon 10.

FIG. 10 is a flow diagram depicting the periodic refresh of beacon display 22 with content from distributed data network 14 and possibly local sources based upon local or remote business rules. When beacon 10 is activated in step 100, it is in idle mode 102 most of the time. Based upon receiving periodic trigger 104 or an event trigger 106, control electronics 34 perform content refresh on display 22 according to step 108. According to step 110, content is rendered on display 22 according to the refresh of step 108.

The periodic trigger 104 and event trigger 106 may be the same as or essentially concurrent with those depicted and described with respect to elements 70 and 72 of FIG. 7. Thus, the display 22 is refreshed at the same time new information is sent to distributed data network 14 and the display content is based in part upon that new information.

Figure 11:
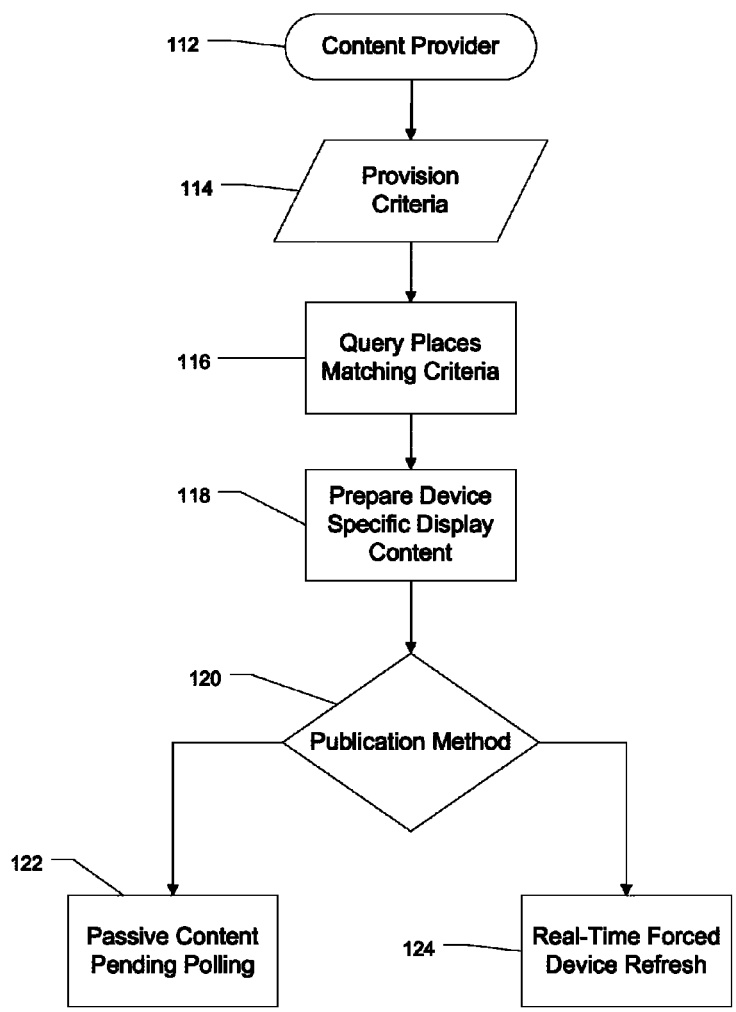
FIG. 11 is an exemplary flow chart representation of a process by which distributed data network 14 provides information to beacon 10.

FIG. 11 depicts a method by which content is selectively delivered from distributed data network 14 to one or more beacon(s) 10 at different geographical locations or places. A content provider 112 has provided content to distributed data network 14 having associated provision criteria 114 that defines which beacon devices 10 the content is to be delivered to. According to this example, the content provider 112 may be the business client 12. An example of content might be an updated attribute for a business establishment 4 such as new operating hours or a change in which forms of payment are accepted. Another example of such content might be advertising or promotional content.

The distributed data network 14 queries (in step 116) its database to find beacon devices 10 that match the criteria. The content is then prepared in step 118 according to the results of the query 116. The content is then published (transferred) to the selected beacons 10 either passively 122 or immediately 124. The passive option relies on polling signals from each beacon 10. The real-time forced option 124 occurs when there is an immediate need to transfer the information to the appropriate beacons 10.

Figure 12:
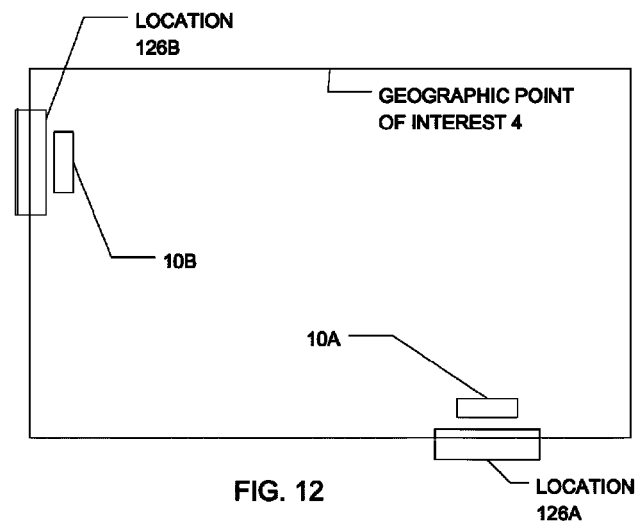
FIG. 12 is an exemplary plan view schematic diagram depicting more than one beacon 10 installed at a business establishment 4.

FIG. 12 depicts a situation in which two beacons 10A or 10B are deployed for a single geographic point of interest 4. In this situation, beacons 10A and 10B are deployed at locations 126A and 126B respectively. In one embodiment, beacons 10A and 10B are each similar to beacon 10 described with respect to FIGS. 3A, 3B and 4, and are each separately in communication with distributed data network 14 via communication electronics 36. In another embodiment the beacons 10A and 10B can communicate directly with one another using a wireless protocol such as IEEE 802.11.

In one embodiment, beacon 10B is a "slave" to beacon 10A. Thus, whenever a change is made to beacon 10A (for example, from open to closed), beacon 10B automatically replicates that change. There may be additional beacons 100, 10D, and so on that also operate as slaves to beacon 10A. This would be a useful configuration when locations 126A and 126B are different entrances to the same store. Thus, when an operator inputs "closed" at one location (via user interface 32 at beacon 10A), the remaining beacons (10B, 100, etc.) at all other locations immediately replicate the selection.

In another embodiment beacons 10A and 10B operate independently and provide different GPS coordinates to the distributed data network 14. This may be useful for the situation in which the establishment 4 is a very large facility having entrances that are far apart and possibly even having different postal addresses. In this situation a customer may query to find out the location of a particular entrance. One particular example might be a national park that has entrances that are far apart. In such a case, the "state" might be whether the park entrance is currently open or closed and/or the road conditions (in real time) leading up to that entrance.

In yet another embodiment, beacons 10A and 10B operate somewhat independently but beacon 10A has the ability to override certain functions of beacon 10B. An exemplary application would be a larger store having an outer entrance with beacon 10A and an internal pharmacy having beacon 10B. Beacon 10B in this case would only be allowed to have an "open" state when beacon 10A has an "open" state.

Figure 13:
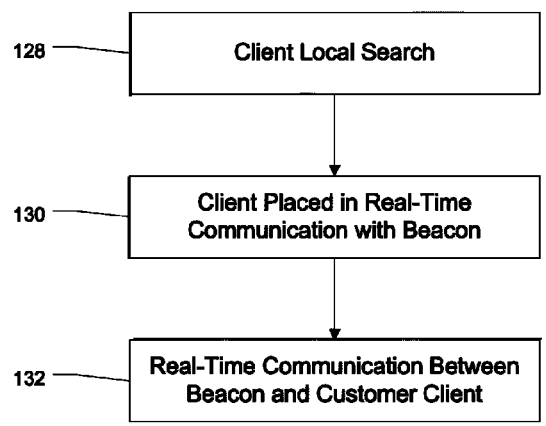
FIG. 13 is an exemplary flow chart of communications between a client and beacon 10

FIG. 13 depicts a process by which a customer can receive real time information directly from geographic point of interest 4. According to step 128, a customer performs a local search for a geographic point of interest 4 utilizing customer client 6. According to step 130, the customer client 6 is placed in real-time communication with beacon 10. In one embodiment, establishing communication between the customer client 6 and beacon 10 may be a result of an action by location based service 8 providing a link to beacon 10. In another, this communication may be initiated by an action of the location based service 8 followed by an action by the distributed data network 14.

Then according to step 132, the customer can obtain real time "feeds" from beacon 10 including operating status information, attribute information, and/or GPS based location information. This information may include whether the geographic point of interest 4 is open or closed, road conditions near the geographic point of interest 4, video feed from the geographic point of interest 4, or even the availability of a particular product, access, or service. While being linked to the beacon 10, the customer may be able to directly browse or query the beacon 10 for additional information. Thus, beacon 10 may function as an embedded web server and be able to provide information to multiple customers in a real time manner.

In another embodiment, the method of FIG. 13 may be performed between a client 12 and beacon 10 when client 12 is remote from beacon 10. An example might be the desire of a business owner to view activities or statuses of various business establishments 4 owned by the business owner.

The specific embodiments and applications thereof described above are for illustrative purposes only and do not preclude modifications and variations encompassed by the scope of the following claims.

What we claim is:

1. A computer based method of displaying and providing updated information concerning a geographic place of interest comprising:

providing a beacon device including a housing supporting control electronics, a display, a user interface for receiving information indicative of an operating status of the geographic point of interest, and communication electronics, the housing configured to be suspended in a visible location in the geographic place of interest;

the control electronics receiving the information;

generating an image on the display visibly communicating the information; and utilizing the communication electronics to transmit the information to a location based service which is one of an online business directory service, an internet search engine database, and an online social media service thereby updating the location based service.

2. The method of claim 1 further comprising suspending the housing adjacent to a vertical surface wherein the image is visible within and/or proximate to the geographic place of interest.

3. The method of claim 2 wherein the vertical surface is visible proximate to an entrance to the geographic place of interest.

4. The method of claim 1 wherein the information includes attribute information indicative of an attribute of the geographic point of interest.

5. The method of claim 4 wherein the attribute is one or more of a payment accepted at the geographic point of interest and normal operating hours of the geographic point of interest.

6. The method of claim 1 further comprising receiving a request for information through the communication electronics and wherein transmitting the information is in response to the request.

7. A computer based method of providing information concerning a geographic point of interest comprising:

providing a beacon device including control electronics and communication electronics, the beacon device configured to be fixedly located at the geographic point of interest;

the control electronics receiving information concerning the geographic point of interest;

the control electronics receiving a request for the information through the communication electronics;

the control electronics transmitting the information to a location based service which is one of an online business directory service, an internet search engine database, and an online social media service in response to the request;

wherein the information includes:

one of operating status information indicative of an operating status of the geographical point of interest and attribute information indicative of an attribute of the geographic point of interest, the information received through the communication electronics and including global position data; and a location of the geographic point of interest based upon the global positioning data; and wherein the beacon device includes a housing configured to be suspended in a visible location in the geographic place of interest and a display that generates an image communicating at least some of the information.

8. The computer based method of claim 7 wherein the beacon device includes a user interface, the information includes operating status information received through the user interface.

9. A computer based system for displaying and providing reconciled information concerning a geographic point of interest comprising:

a beacon device having a housing configured to be suspended in a visible location relative to the geographic point of interest, the housing supporting control electronics electronically coupled to a display, a user interface, and communication electronics, the beacon device configured to:

receive attribute information indicative of an attribute of the geographic point of interest;

receive operating status information through the user interface indicative of a status related to the geographic point of interest;

generate an image on the display that communicates information including one or more of the attribute information and the operating status information; and transmit the information to a location based service which is one of an online business directory service, an internet search engine database, and an online social media service thereby updating the location based service.

10. The computer based system of claim 9 wherein the geographic point of interest is a business establishment, the beacon housing is configured to be suspended adjacent to a vertical surface in the business establishment so that the image is visible at a location outside of the business establishment.

11. The computer based system of claim 9 further comprising a distributed data network configured to facilitate and optimize communication between the beacon device and the location based service.

12. The computer based system of claim 9 wherein the beacon device is configured to receive a request from the location based service and wherein transmitting the information is in response to the request.

13. A computer based system for displaying and providing reconciled information concerning a geographic place of interest comprising:

a beacon device having a housing configured to be suspended in a visible location relative to a geographic point of interest, the housing supporting control electronics, a display, and communication electronics, the beacon device configured to:

receive information concerning the geographic point of interest;

receive a request for information concerning the geographic point of interest; and transmit the information to a location based service which is one of an online business directory service, an internet search engine database, and an online social media service, the information includes one or more of the attribute information and the current state information;

wherein the information includes:

one of operating status information indicative of an operating status of the geographical point of interest and attribute information indicative of an attribute of the geographic point of interest, the information received through the communication electronics and including global position data; and a location of the geographic point of interest based upon the global positioning data; and wherein the beacon device is configured to visibly communicate at least some of the information on the display.

14. The computer based system of claim 13 wherein the beacon device includes a user interface, the information includes operating status information received through the user interface.

15. The computer based system of claim 13 further comprising a distributed data network configured to facilitate and optimize communication between the beacon device and the location based service.

16. The computer based system of claim 15 further comprising the location based service, the location based service configured to receive the request from a customer and to provide the information to the customer.

17. The method of claim 1 wherein the information further includes whether certain personnel are present at the geographical point of interest.

18. The method of claim 1 further comprising:

providing a second beacon device;

transmitting the information to the second beacon device whereby the second beacon device displays a second image that communicates the information.

19. The method of claim 7 further comprising wherein the request for information originates from a search query received by a location based service and whereby the information provides a real time update to the location based service in response to the search query.

20. The computer based system of claim 9 wherein the operating status information includes information indicative of whether certain personnel are present at the geographic point of interest.

21. The computer based system of claim 9 wherein the beacon device is a first beacon device and further comprising a second beacon device having a second display and configured to receive the information from the first beacon device and to generate an image on the second display that is indicative of the information.

22. The computer based system of claim 11 wherein the distributed data network is configured to:

receive a query originating from customer querying the location based service;

send a request to the beacon device for updated information;

receive the information from the beacon device in response to the request; and send the information to the location based service whereby the location based service can display results that are updated in real time.

* * * * *